US010845219B2

(12) United States Patent
Erlich et al.

(10) Patent No.: US 10,845,219 B2
(45) Date of Patent: Nov. 24, 2020

(54) LINEAR ENCODER FOR A LINEAR POSITION MEASUREMENT DEVICE HAVING A STATIONARY PART AND A MOVING PART

(71) Applicant: Servosense (SMC) Ltd., Petach-Tikva (IL)

(72) Inventors: Markus Erlich, Tel-Aviv (IL); Yves Villaret, Hadera (IL)

(73) Assignee: Servosense (SMC) Ltd., Petach-Tikva (IL)

( * ) Notice: Subject to any disclaimer, the term of this patent is extended or adjusted under 35 U.S.C. 154(b) by 65 days.

(21) Appl. No.: 16/084,240

(22) PCT Filed: Mar. 13, 2017

(86) PCT No.: PCT/IL2017/050318
§ 371 (c)(1),
(2) Date: Sep. 12, 2018

(87) PCT Pub. No.: WO2017/158595
PCT Pub. Date: Sep. 21, 2017

(65) Prior Publication Data
US 2019/0056247 A1 Feb. 21, 2019

Related U.S. Application Data

(60) Provisional application No. 62/307,516, filed on Mar. 13, 2016.

(51) Int. Cl.
*G01D 5/34* (2006.01)
*G01D 5/347* (2006.01)
(Continued)

(52) U.S. Cl.
CPC ....... *G01D 5/34746* (2013.01); *G01D 5/2492* (2013.01); *H02K 11/21* (2016.01); *H02K 41/02* (2013.01)

(58) Field of Classification Search
CPC ..... G01D 5/34746; H02K 11/21; H02K 41/02
See application file for complete search history.

(56) References Cited

U.S. PATENT DOCUMENTS 5,907,200 A    5/1999 Chitayat
5,925,943 A *  7/1999 Chitayat ................ G01D 5/145
                                                310/12.15
(Continued)

FOREIGN PATENT DOCUMENTS

CN    101779370    7/2010
CN    104094507    10/2014
(Continued)

OTHER PUBLICATIONS

Supplementary European Search Report and the European Search Opinion dated Sep. 25, 2019 From the European Patent Office Re. Application No. 17765982.8. (10 Pages).
(Continued)

*Primary Examiner* — Muhammad S Islam (57) ABSTRACT

A linear encoder has a stationary part and a moving part, and measures and encodes a relative displacement between the stationary part and the moving part along a linear extent of displacement. The encoder comprises multiple machine sensible elements arranged on one of the parts in a predetermined, pattern; and multiple evenly placed sensors arranged along the other part along the entire linear extent, thereby to measure and encode the displacement. The encoder may be an absolute encoder and may be based on magnetic or optical or any other kind of sensing.

25 Claims, 6 Drawing Sheets

(51) Int. Cl.
  *H02K 41/02* (2006.01)
  *H02K 11/21* (2016.01)
  *G01D 5/249* (2006.01)

(56) References Cited

U.S. PATENT DOCUMENTS

| | | | |
|---|---|---|---|
| 5,994,798 A | 11/1999 | Chitayat | |
| 2001/0054851 A1 | 12/2001 | Tsuboi et al. | |
| 2006/0091304 A1 | 5/2006 | Saint Clair | |
| 2007/0290638 A1* | 12/2007 | Faizullabhoy | G01D 5/34746 318/135 |
| 2010/0140463 A1 | 6/2010 | Villaret | |
| 2011/0062901 A1 | 3/2011 | Busch | |
| 2015/0028699 A1 | 1/2015 | Hofstetter et al. | |
| 2015/0349618 A1 | 12/2015 | Kleinikkink et al. | |

FOREIGN PATENT DOCUMENTS

| | | |
|---|---|---|
| DE | 19518664 | 5/1996 |
| WO | WO 2017/158595 | 9/2017 |
| WO | WO 2017/158595 A9 | 9/2017 |

OTHER PUBLICATIONS

International Search Report and the Written Opinion dated Jan. 14, 2018 From the International Searching Authority Re. Application No. PCT/IL2017/050318. (10 Pages).
Translation Dated Feb. 3, 2020 of Notification of Office Action dated Jan. 2, 2020 From the State Intellectual Property Office of the People's Republic of China Re. Application No. 201780025197.6. (5 Pages).
International Preliminary Report on Patentability dated Dec. 11, 2018 From the International Preliminary Examining Authority Re. Application No. PCT/IL2017/050318. (11 Pages).
Notification of Office Action and Search Report dated Jan. 2, 2020 From the State Intellectual Property Office of the People's Republic of China Re. Application No. 201780025197.6. (12 Pages).
Notification of Office Action and Search Report dated Aug. 7, 2020 From the State Intellectual Property Office of the People's Republic of China Re. Application No. 201780025197.6. (15 Pages).
Translation dated Sep. 14, 2020 of Notification of Office Action dated Aug. 7, 2020 From the State Intellectual Property Office of the People's Republic of China Re. Application No. 201780025197.6. (12 Pages).

* cited by examiner

LINEAR ENCODER FOR A LINEAR POSITION MEASUREMENT DEVICE HAVING A STATIONARY PART AND A MOVING PART

RELATED APPLICATIONS

This application is a National Phase of PCT Patent Application No. PCT/IL2017/050318 having International filing date of Mar. 13, 2017, which claims the benefit of priority under 35 USC § 119(e) of U.S. Provisional Patent Application No. 62/307,516, filed on Mar. 13, 2016. The contents of the above applications are all incorporated by reference as if fully set forth herein in their entirety.

FIELD AND BACKGROUND OF THE INVENTION

The present invention, in some embodiments thereof, relates to a position encoder and, more particularly, but not exclusively, to an encoder used in association with a motor such as a linear motor, and with application to a magnetic absolute linear encoder.

In devices such as linear servo motors for machine tools and industrial robots, positioning accuracy is required to exceed machining accuracy. Machining techniques for applications such as semiconductor chip manufacture require ever-increasing machining accuracy, and consequently the required positioning accuracy is also increasing. An accurate position measuring device is necessary in order to perform high-accuracy positioning, and linear encoders are provided to fulfill the positioning requirement.

A linear encoder is a sensor, transducer or read-head paired with a scale or pattern that encodes position. The sensor reads the scale in order to convert the encoded position into an analog or digital signal, which can then be decoded into a position by a digital readout head (DRO), drive or motion controller. Conventionally, the scale extends over the entire length of a trajectory to be measured, and the sensor moves over the scale measuring the position. Most available linear encoders provide a DRO head to be fixed with the moving element, providing digital or analog signals which are transmitted to the drive or motion controller by means of electrical cable. The same electrical cable is also used to supply the electric energy for the DRO processing electronics. The electrical cable is thus fixed to the drive on one end, and is mobile with the moving element on its other end. The moving element often executes high speed motion cycles, and thus the moving cable is a major factor in system failure.

The encoder can be either incremental or absolute. Incremental encoders are able to sense movement relative to their initial position at power on, while absolute encoders are able to measure actual position. Linear encoder technologies may be based for example on optical, magnetic, inductive, capacitive and eddy current sensing. The elements to be sensed are arranged as a scale made up of anything that can be sensed by the sensing elements, including an optical scale, a magnetic scale, an inductive scale, a capacitive scale, and a scale able to induce eddy currents in sensing coils. U.S. Pat. Nos. 6,492,911 and 7,126,495 discuss capacitive linear encoders. In the former, FIG. 32 shows a stationary scale, and FIG. 33B gives a shape. The capacitive encoder of the cited art gives an analog signal pattern. Linear encoders are used for example in metrology instruments, motion systems and high precision machining tools and manufacturing equipment ranging from digital callipers and coordinate measuring machines to stages, CNC Mills and industrial robots, and manufacturing gantry tables to high precision semiconductor steppers.

Magnetic encoders can be built on the incremental principle but typically have a disadvantage with regards to resolution and accuracy. Since the magnetic field decreases with distance the magnetic sensors must be place at a distance smaller or at least in the same range as the period of the pattern. Placing magnetic sensors very close to the static magnetic elements requires a precise and expensive mechanical design. Thus, the period length and the number of periods are limited by the mechanical precision achievable.

Both rotary and linear positioning encoding devices are available.

Figure 3:
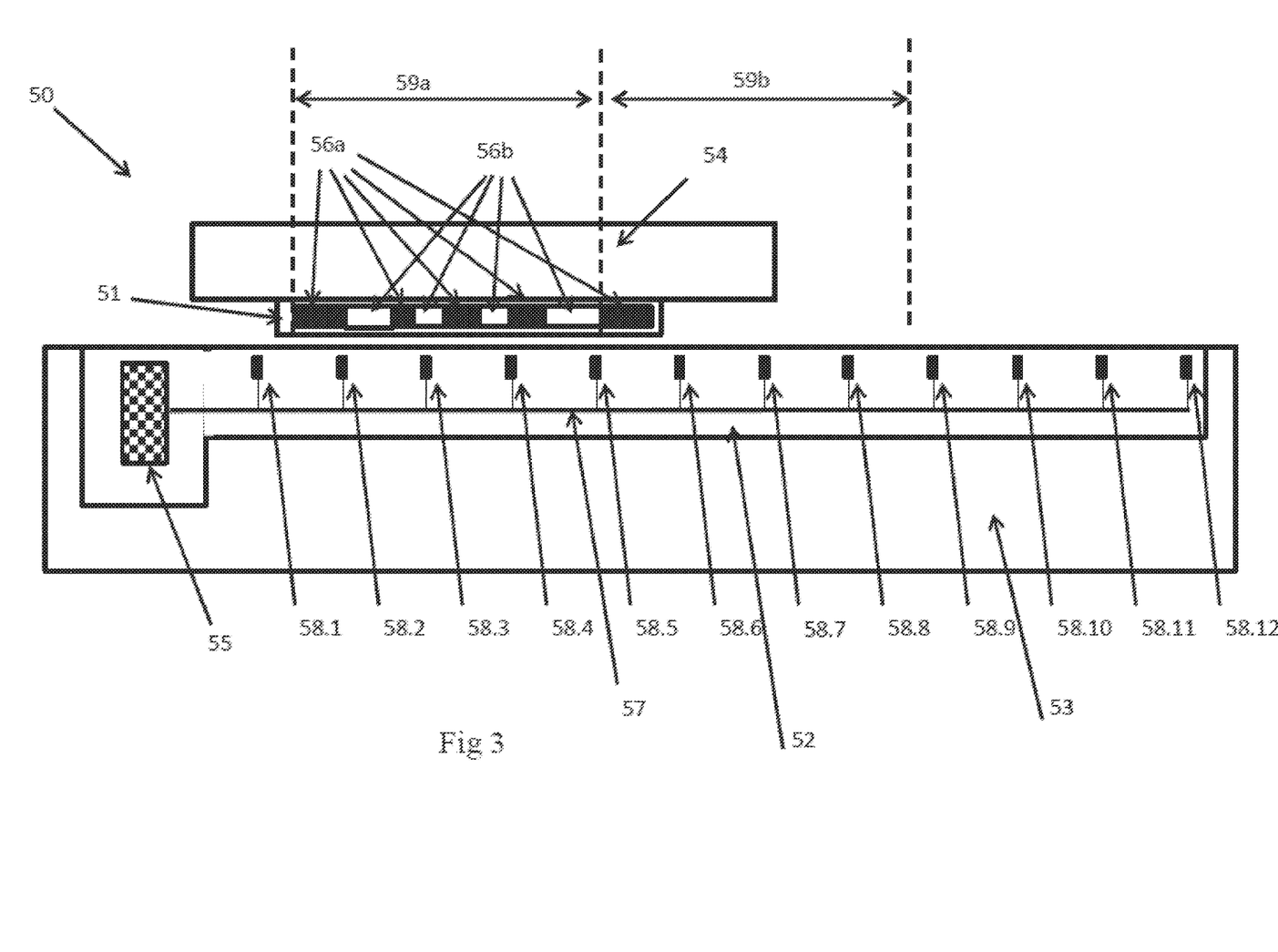
FIG. 3 is a simplified diagram illustrating a linear encoder according to a first embodiment of the present invention.

U.S. Pat. No. 8,492,704 to Villaret et al, filed May 28, 2008 discloses an encoder and method for precisely indicating the position of a first member with respect to a second member by utilizing a pattern of machine-sensible elements carried on a single track of the first member; the machine-sensible elements being located at successive incremental rotations on the track of the first member and each representing one of the binary values "0" and "1"; and a plurality of "n" sensors, wherein "n" is greater than "3", carried by the second member at a plurality of spaced locations thereon in proximity to the track of the first member and alignable with the machine-sensible elements of the first member. Each sensor thus senses the binary value of each machine-sensible element with which it is aligned to produce an output corresponding to the binary value of the machine-sensible element with which it is aligned, whereby the outputs of all the sensors constitute a binary code, preferably a Gray code, of "n" bits identifying the position of the first member with respect to the second member. FIG. 3 thereof relates to a linear encoder. The machine sensible elements forming the gray code are static, and the evenly spaced sensors are on the moving part. The machine sensible parts are in effect the detectable elements on the rotor that have been straightened out, giving absolute position measurement for the same accuracy as the rotor version but for a distance which is limited to the 360 degree circle made by the circumference of the rotor.

The encoding length is limited by the need to present a differentiable signal to the sensors over the full measurable distance. The signal is required to be differentiable to the level of resolution demanded by the particular application. Increasing the length for the same accuracy entails a considerable increase in costs. A second track of detectable patterns or a repeating period of the pattern may be needed, or the connections may entail a measurement signal with a much larger number of bits.

The known art requires a moving cable to supply current to the sensors and obtain the signals from the sensors, since the sensors are located on the moving part. A specially designed moving cable is required which is an expensive component and has a relatively high failure rate or probability of breakage. The cable may also be responsible for vibrations, and other perturbations in velocity. A cable chain can affect smoothness of the motion, smoothness being particularly important for applications such as printing where an even layer of ink needs to be deposited.

Much of the prior art has two tracks for scaling, a first track providing an absolute position with a low resolution and the second track providing a high resolution position within a period of the high resolution track. The above-mentioned U.S. Pat. No. 8,492,704, which teaches a rotary system, has a single track, but in the rotary case a limited length of the entire circumference allows the positioning to be repeated at cyclic intervals. However where there is no natural period, such as in the linear case, an absolute position is needed as well.

U.S. Pat. No. 5,907,200 by Chitayat discloses addressable hall sensors distributed along the movement path, and a set of equidistant magnets, fixed to the moving element, which slide along the path in proximity with the hall sensors. Each hall sensor signal then transits from a first value to a second value within a range of positions of the moving element. The absolute position is calculated from the sensor address and the analog or digital value of the sensors. For each pair of sensors, there is one position transition range. One transition range is defined by the distance between two hall sensors. Calculation of a high resolution position value is thus defined by the precision of the hall sensor measurement. Thus, if for example the hall sensor signal is evaluated with a 10 bit analog to digital device, then the maximum resolution may be equal to $\frac{1}{1024}^{th}$ of the distance between two magnets.

SUMMARY OF THE INVENTION

The object of the present invention is to provide a cable-less absolute encoder able to produce high resolution position information with a greatly reduced number of sensing elements, the sensing elements being located on the static element.

The present invention relates generally but not exclusively to a linear encoder which embodiments avoid the need for moving cables by providing detectors along the full linear path. The passive element, namely the pattern, moves relative to the detectors along the full length of the path covered by the detectors. The detectors may be distinguished by individual or group addressing and are able to decode the displacement of the pattern and thus of the moving part at any point along the full trajectory.

In an embodiment, the path is linear, but the present invention is more generally applicable for any path shape. For example, a circular path could be used for rotary encoders, in which case the present embodiments are particularly applicable to cases of large diameter as often found in direct drive motors.

In the arrangement of the present embodiments, an alignment of sensors is provided along the path. For a given position of the moving element, a first number of sensors are in proximity with the machine sensible elements, thus becoming active, the remainder of sensors not being in proximity with the machine sensible elements, and being inactive. Thus, at any given position of the moving element, some sensors are active and some sensors are inactive. This contrasts with the prior art of U.S. Pat. No. 8,492,704 to Villaret where all sensors are active all the time as the machine sensible elements are laid out along the path and the sensors are always in proximity of one element or another.

According to an aspect of some embodiments of the present invention there is provided a linear encoder for a linear position measurement device having a stationary part and a moving part, the encoder designed to measure and encode a relative displacement between said stationary part and said moving part along a linear travel extent between a first travel end location and a second travel end location; the encoder comprising:

a plurality of machine sensible elements arranged on a first of said parts in a predetermined, pattern, the pattern comprising a property changing along a length thereof; and a plurality of evenly placed sensors arranged along a second of said parts along an entirety of said linear travel extent between said first travel end location and said second travel end location, thereby to measure and encode said displacement.

In an embodiment, said first part is said moving part and said second part is said stationary part.

In an embodiment, a length of said predetermined pattern is shorter than said entire extent.

In an embodiment, said evenly placed sensors each have a unique address.

In an embodiment, said evenly placed sensors comprise one member of the group of sensors consisting of optical, magnetic, inductive, capacitive, photoelectric and eddy current sensors.

In an embodiment, said machine sensible elements are one member of a group consisting of optical elements, magnetic elements, inductive elements, capacitive elements, and metallic field perturbation elements.

In an embodiment, said predetermined pattern defines a sequence of repeating segments, each segment comprising one cycle of change of said property.

In an embodiment, said segments are spread over a length equivalent to a predetermined number of said evenly spaced sensors.

In an embodiment, said machine sensible elements have a second changing property.

Exemplary embodiments may comprise an additional machine-sensible element placed outside of said pattern to indicate to said sensors a start of said length.

According to a second aspect of the present invention there is provided a method of absolute linear encoding of a relative displacement between two parts over a total linear displacement length, the method comprising:

providing a plurality of sensors spaced over said total displacement length;

providing a predetermined pattern of machine-sensible elements, said pattern comprising a property varying over distance along said pattern;

displacing said pattern linearly with respect to said plurality of sensors over said displacement length; and measuring said displacing using said plurality of sensors.

In an embodiment, said sensors are evenly distributed over said displacement length.

The method may comprise extending said pattern extends over a length equivalent to a predetermined number of said evenly distributed sensors.

The method may comprise providing an additional sensible element at a first end of said pattern to indicate a pattern start or end to said plurality of evenly distributed sensors.

In an embodiment, said pattern is in a moving part of a linear motor and said plurality of sensors are on a stationary part of said linear motor.

The method may comprise providing individual addressing to each of said plurality of sensors.

In an embodiment, a length of said pattern is shorter than said displacement length.

In an embodiment, said additional machine-sensible element is a repetition of a first machine-sensible element of said predetermined pattern.

The plurality of sensors of the method may be any of magnetic sensors, Hall-sensors, optical sensors, inductive sensors, and capacitive sensors, and any other suitable sensors that may be available.

The method may comprise:

detecting sensors currently in proximity with machine sensible elements as active sensors;

calculating a first absolute low resolution position based on a position of the active sensors;

calculating a code of a number N of bits, by setting each of said N bits to a Boolean output value of N of said active sensors, said code thereby defining a medium resolution position relative to one of the active sensors;

combining said first absolute low resolution position value with said second relative medium resolution position value to calculate an absolute medium resolution position.

When said sensors output analog values, the method may further comprise:

setting each analog output to a first Boolean value when the respective sensor analog output value is in a range indicating that it is in a predefined proximity range of a machine sensible element having said a first property, and a second value otherwise; and calculating a high resolution position from the analog output of said sensors.

According to a third aspect of the present invention there is provided a linear encoder for a linear position measurement feedback device having a stationary part and a moving part, the encoder designed to measure and encode a relative displacement between said stationary part and said moving part along a linear travel extent between a first travel end location and a second travel end location; the encoder comprising:

a plurality of machine sensible elements arranged on a first of said parts in a predetermined, pattern; and a plurality of evenly placed sensors arranged along a second of said parts and arranged such that at any given time only a subset of said plurality of sensors is in sensing proximity to a machine sensible element.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to a position encoder and feedback device and, more particularly, but not exclusively, to an encoder used in association with a motor such as a linear motor, and with particular application to a magnetic absolute linear encoder. The encoder may be for position measurements or commutation switching for a linear motor, stepper motor, actuator or any other use where linear position needs to be measured and typically transmitted to a controller.

The present embodiments provide a series of sensors arranged on a static element over the full extent of the linear travel of the moving element further here referred as the moving path, and a pattern of sensible elements fixed on a moving element on a single track, for example magnetic elements, whose position can be detected by the sensors to measure relative position between the moving and static elements.

Sensible elements and sensors can be of any type in which sensible elements may have at least two properties and the output of sensors provide a value depending on the property of the sensible element in proximity.

For example, the following is a non-exhaustive list of possible sensible elements and sensors:

Permanent magnets and air, sensed by magnetic sensor;

Permanent magnets of two polarities sensed by magnetic sensor;

Metal tooth sensed by inductive sensor;

Conductive tooth sensed by eddy current sensor;

Reflecting and non reflecting optical surfaces sensed by optical devices;

Herein, the preferred embodiments are described with reference to a first static element and a second moving element. It must be understood that the invention is also applicable whenever the first element is moving and the second element is static.

In an embodiment, the machine sensible elements may be passive and fixed to the moving element, and thus no moving cable is needed, resulting in both cost savings and improvements in reliability. In this embodiment, the sensors may be mounted directly on a printed circuit board, and may be provided with static connections for power and signaling.

Sensors may be individually addressable, or may be divided in a number of addressable groups. An electronic processing unit is able to read out the output values of a number of sensors, and also detect the active or inactive status of a number of sensors.

The present embodiments allow a simpler and more economical linear motor since the encoder does not require a moving cable or cable chain.

Advantages known for the rotary case, as in above-mentioned U.S. Pat. No. 8,492,704 may be extended to the linear case. The rotary case gives absolute position, but only over a single revolution, and the present embodiments not only unwrap from the rotary to the linear case but allow for a length scale which is longer than the single period rotation of the rotary case. The present embodiments can use a magnetic system with broadly the same results as prior art optical scale systems but at a much lower cost. Conventional systems using a magnetic system include a cable chain which is in itself an expensive component and prone to failure.

On an Encoder head, fixed to the moving element, the machine sensible elements are arranged as a number of consecutive machine sensible units along the moving path. Each machine sensible unit includes a number of the machine sensible elements disposed according to a pre-defined pattern. The pattern may be designed as described in above referred to U.S. Pat. No. 8,492,704 to Villaret et al, filed May 28, 2008. As disclosed therein, a pattern design may define a number N of sensors. The number N defines a length of the sensible unit as being N times the distance between two sensors.

The pre-defined pattern defines a given number of consecutive segment lengths, each segment having a length and a property. At each segment position one machine sensible element of the assigned length and property may be fixed. Typically, some machine sensible units have one machine sensible element fixed to each segment, while other machine sensible units may have a smaller number of sensible elements fixed to segments. Typically, two segment properties may be defined, depending on the sensor type. Examples are:

South or North polarity magnets
Magnet or no Magnet
Reflective or absorptive optical surface
Tooth or no tooth Machine sensible units may be virtual objects that define arrangements of the machine sensible element. Whenever a machine sensible element is not installed at a segment of a sensible unit, there is no need for physical support material at that segment position.

A sensor interval may be set to be equal to 1/Nth of the sensible unit length.

An encoder head may include a sufficient number of sensible units to ensure that there will always be at least N sensors in proximity of a machine sensible element at all times. To each sensor, one can assign an address according to an order of placement in a direction of the path. A further requirement for the encoder head, and the placement of machine sensible elements is that at each position, all the addresses modulo N of the active sensors cover all of the range 0 to N−1, i.e. that at any position and for any number n in range 0 to N−1 there is an active sensor with address A satisfying modulo(A,N)=n.

If all segments of a machine sensible unit are mounted with machine sensible elements, then a minimum number of machine sensible units is one.

As the encoder head moves along the path, sensors in proximity of sensible elements output an analog value in relation to the property of the machine sensible element in proximity. During the movement of the moving element, the property of the machine sensible element in proximity to a given sensor may thus change between a first property and a second property. The analog value output of the sensor may then transit from a first range of values to a second range of values.

Preferably, the sensors which are not in proximity of any sensible element, further named here as "inactive", may output a pre-defined value.

In a first step, a binary value is deduced by the electronic processing unit for each sensor, indicating that the sensor output value is in a first or second value range. The binary values of the active sensors are combined to give a gray code characteristic of a first rough position value within the range of a set of N active sensors.

It is noted that above mentioned U.S. Pat. No. 8,492,704 has a linear embodiment in FIG. 3. As disclosed therein, the sensors are preferably on the moving elements, and the pattern of machine sensible elements is replicated several times to cover the whole length of the moving path. In another aspect, the embodiment of U.S. Pat. No. 8,492,704 does not provide absolute but incremental position, and the position obtained is only relative to one unknown period of the pattern.

The present embodiments by contrast may have sensors which extend over the entire length to be measured, and only those sensors opposite the machine sensible elements are active at any given time.

The absolute position may be calculated in three steps:

1)_ checking the active or inactive status of a number of sensors and thus calculating a first low resolution position. A method for detecting active sensors will be described lower. The low resolution of the position is approximately the length of N sensor intervals, and the position data is a high precision value representing an active sensor position;

2)_ determining a second medium resolution position by reading the code obtained from the binary values of N active sensors. The second medium resolution is defined by a length of N sensor intervals divided by a number of possible codes for the specific pattern; and 3)_ calculating a high resolution position by reading the sensor output analog values.

As the shape of the entire pattern is known, the sensor signals can reveal where the exact length of the carriage is, and other sensors outside of the area of the carriage remain inactive. It is noted that a sensor can be active, meaning operational, or inactive meaning non-operational.

In an embodiment a sensor outputs an analog value. However sensors that output digital values, such as digital hall sensors, are also applicable. In that case, only step 1 and 2 described above are applicable, and the position data may be of medium resolution only.

In an embodiment, sensors are equally distributed along the path on one or several printed circuit boards. In a first option, printed circuit conducting strips convey the sensor signals directly to the electronic processing unit. In a second option, a number of sensors are interconnected in groups. For each group, an intermediate processing unit gathers output from the sensors and dispatches them by mean of a communication line. A group may be defined as extending over a given length, and the sensors can be disposed on the whole path by the juxtaposition of smaller PCB modules, each module gathering a number of sensors. Such a modular concept allows the use of a single modular design for various path lengths.

The present embodiments may be used to determine a location using three different accuracy levels, a course accuracy, a medium accuracy and a high resolution accuracy.

The encoder may measure the position of a first element moving along a path that includes a stationary element. Sensors are fixed to the stationary element along the path, typically at equidistant spacing. An encoder head is fixed to the first, moving element, and a pattern defines segments of a machine sensible unit. A number of these machine sensible elements may provide segments of variable or fixed length and of one, two or more properties that vary to provide the pattern. The machine sensible elements may be fixed on the encoder head in proximity to the path so as to be sensible to the sensors. The positions, lengths and properties of the sensors and the machine sensible elements are defined along the path.

The method of finding position involves detecting those sensors currently in proximity with machine sensible elements as active sensors. Now a first, absolute, low resolution position can be calculated based simply on the position of the active sensors.

Repeated segments may be provided to repeat the pattern, allowing a given displacement to be separately estimated from each of the segments, provided that a suitable distance between the segments is selected.

In the case of analog sensors, each analog output may be set to a first Boolean value when the respective sensor analog output value is in a range indicating that it is in a predefined proximity range of a machine sensible element having said a first property, and a second value otherwise.

It is then possible to calculate a code using a number N of bits, by setting each of the N bits to a Boolean output value of N of a respective one of the active sensors. The code thereby defines a medium resolution position relative to one of the active sensors.

The first absolute low resolution position value may then be combined with the second relative medium resolution position value to calculate an absolute medium resolution position.

Finally, a high resolution position may be calculated from the analog output of the sensors.

It is known that printed circuit boards on which sensors or machine sensible elements are mounted in the present embodiments may be subject to heating and consequently their expansion must be avoided or compensated.

A number of solutions are presented herein, for example to anchor the sensors to a material with less sensitivity to thermal expansion, or in a second example to fix or glue the PCB itself to a temperature insensitive support or in a third example, to provide small holes in the PCB, with at least some in proximity with the sensor sensitive area, and provide fixing pins in the support material going through these holes, causing the PCB to expand by the same extend as the support material.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways.

Figure 1:
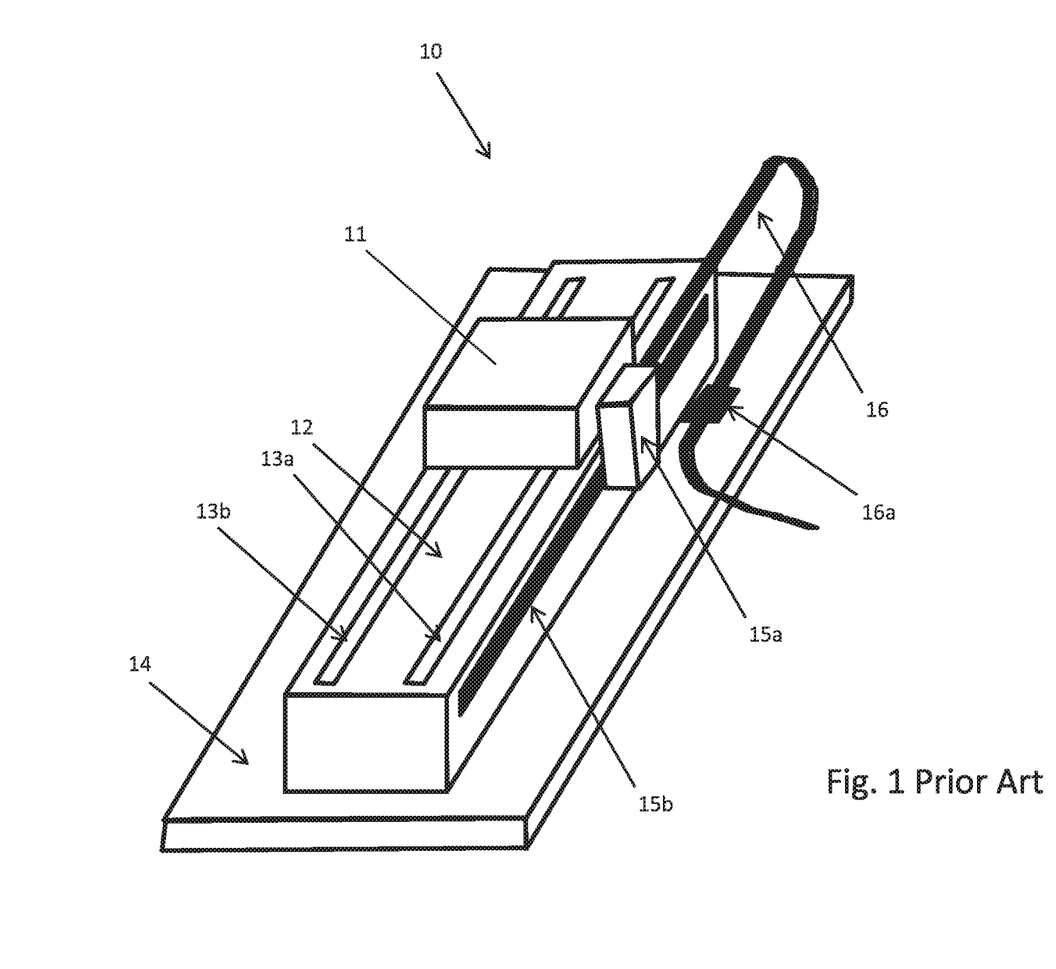
FIG. 1 is a simplified diagram illustrating a linear encoder applied to a linear motor with a load.

Referring now to the drawings, FIG. 1 is a schematic diagram illustrating a linear system 10 with a prior art linear encoder comprising a reading head 15a and a scale 15b. The linear system has a stationary part 12 and a moving carriage 11. The moving carriage 11 slides over the stationary part 12 by means of two linear bearings 13a and 13b. The reading head is fixed to the moving carriage 11 on its upper part, while its lower part moves along and in proximity to the scale 15b. The lower part of the reading head includes the sensors used for the linear encoder to sense the scale pattern. The scale is glued to the stationary part along and in proximity to the path of the lower part of the reading head. A cable chain 16 is used to provide electric power to the reading head and transmit position data or signals to the system controller (not shown). The cable chain is anchored to the base 14 by a clamp 16a and its end is fixed to the moving reading head 15a.

In such system, the cable chain is a major factor in cost and failure. It is thus desirable to provide a linear encoder which does not require a cable chain. In particular, there are implementations of linear motors where the electrical windings are on the static part, and do not need a cable chain for the motor, as shown for example in U.S. Pat. No. 5,925,943 by Chitayat. As disclosed therein, a cable-less encoder may provide a totally cable-less solution.

Figure 2:
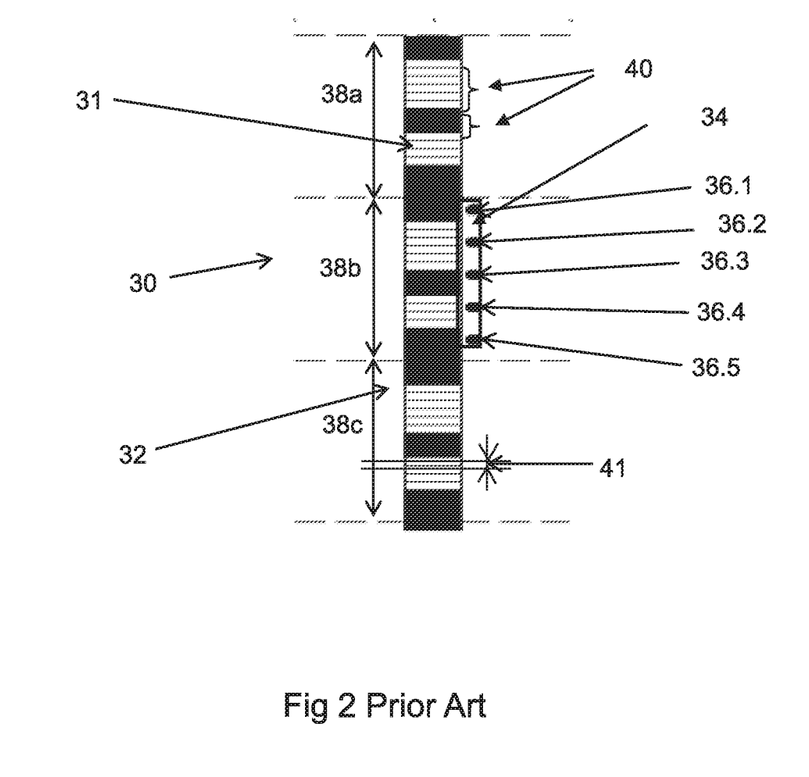
FIG. 2 is a simplified diagram illustrating a prior art linear encoder.

FIG. 2 shows a linear encoder taken from FIG. 3 of U.S. Pat. No. 8,492,704 Villaret et al, filed May 28, 2008. A linear encoder 30 utilizes machine-sensible elements 31 as shown, in this case optical elements, which are carried on a single linear track on the moveable member 32. The sensors 36.1 . . . 36.5, which are optical sensors, are fixed in a linear array on the fixed member 34.

In FIG. 2, the machine-sensible elements 31 on moveable member 32 are also optical elements such as light-transmissive or light non-transmissive elements and are arrayed in a straight line. They are divided into three similar periods, shown at 38a, 38b and 38c, respectively, each period comprising 20 incremental positions or sectors 41.

Fixed member 34 carries the five sensors 36.1-36.5 also arrayed in a single line and spaced equally from each other. In the initial position of the moveable member 32 with respect to the fixed member 34, the array of five sensors 36.1-36.5 extends over the length of one period of the optical elements, namely the length of the pattern of one period as indicated by 38a, 38b or 38c.

The pattern illustrated in FIG. 2 is linear and periodic. Each of the periods 38 a-38c can be regarded as a straightened out version of a rotary encoder.

In the example of equally distributed sensors, the position modulo one period is considered. In that case the term "equally distributed" for n sensors, means that the sensed positions x(i) by sensors i verify the relations $$[(x(i+1)-x(i)) \bmod L] = \pm L/n, \text{ for all } i \text{ from } 1 \text{ to } n$$

where L is the length of one period of the pattern. The pattern may be arranged to produce a Gray code when read out. A Gray code is a binary code in which two successive values change only by a single digit, and is useful in encoders since it provides an element of error correction.

The arrangement described in FIG. 2 provides a Gray code output based on a single track of sensible elements, whereas other systems typically use multiple tracks and several arrays of sensors. Moreover, since the sensors are evenly distributed, simple commercially available sensors of a standard size may be provided.

In the arrangement described in FIG. 2, the measured position is relative to one pattern period. The position information is thus modulo one period length, and the absolute position may be calculated by increments from an initial position. Thus, this arrangement does not provide an absolute encoder.

In a further aspect, this arrangement does not need a moving cable chain, but the moving element is longer than the path of movement, thus occupying a large space and a great number of sensible elements, resulting in high cost and mostly unpractical large volume of the system.

Reference is now made to FIG. 3, which illustrates an encoder according to a first preferred embodiment of the present invention. In FIG. 3, a linear device 50 again has a stationary element 53 and a moving element 54. The moving element may slide on a linear path on or in proximity to the stationary part 53. The moving part 54 has a series of machine sensible elements 56a and 56b arranged in a predetermined pattern on a single track. Sensible elements 56a have a first property, for example north magnetic polarity, and sensible elements 56b have a second property, for example south magnetic polarity. Equidistantly placed sensors 58 (58.1-58.12) are arranged on a PCB 52, fixed to the stationary part and extend along the entire linear path, so that there are sensors covering all of the relative motion of the two parts.

As explained above, the present embodiment is described in relation to stationary and moving elements, and thus advantageously provides a cable-less encoder. Moving wires are expensive, are sources of mechanical vibration and may suffer mechanical failure. However an embodiment where the machine sensible elements are on the stationary element and the sensors are on the moving element is also possible.

The sensors 58 are simply mounted on a printed circuit board with built-in connections for signaling and power.

As shown in FIG. 3, the sensors are connected by conducting strips on the PCB, schematically shown by the line 57 of FIG. 3, to an electronic processing unit 55.

The evenly placed sensors may each have a unique address which address can be hardwired into the conducting strips of the PCB.

The evenly placed sensors 58 may be magnetic sensors, in which case the machine-sensible elements 56 may be magnets. The evenly placed magnetic sensors may conveniently be Hall-sensors. In general, magnetic linear encoders may employ either actively magnetized or passive-variable reluctance-scales and position may be sensed using sense-coils, or Hall effect or magneto resistive read-heads.

Different resolution levels are available ranging from relatively coarse to relatively fine. If the sensors are not optical sensors then scale periods or measurement intervals that typically range from a few hundred micrometers to several millimeters, may permit resolutions in the order of a micrometer.

Alternatively the sensors may be optical sensors as in FIG. 2 above and may for example employ shuttering/Moiré, diffraction or holographic principles. Typical incremental scale periods or measurement intervals may vary from hundreds of millimeters down to the sub-micrometer range, and following interpolation can provide resolutions as fine as a nanometer.

The present embodiments may remove any dependency imposed on the resolution by the size of the measurement interval.

As a further alternative, sensing may use inductive sensors. Inductive technology is known to be robust to contaminants. The machine sensible elements may be formed by holes in a metal, or by extending teeth, and the sensors may be a series of inductors operated at high frequency.

Capacitive sensors are another alternative. Capacitive linear encoders work by sensing the capacitance between a reader and scale. Typical applications are digital calipers. One of the disadvantages is the sensitivity to uneven dirt, which can locally change the relative permittivity.

As a further alternative, the sensors may be eddy current sensors, for example as disclosed in U.S. Pat. No. 3,820,110.

Again referring to FIG. 3, the encoder head 51 is fixed to the moving element 54. In the particular example of FIG. 3, two sensible units 59a and 59b are defined. The sensible unit 59a is fully mounted with eight machine sensible elements 56a or 56b. The sensible unit 59b is mounted with only one machine sensible element 56a.

Whenever the carriage length is a multiple of the length of the machine sensible unit, the encoder head may include multiple machine sensible units. The number of active sensors may then be larger than the minimum N value defined for the specific pattern, and several readings of the position may be obtained. The multiple readings can be advantageously used to comply with safety regulations and standards that require that any inexactitude of the position reading should be detected.

Referring to FIG. 3, addresses 1 to 12 are for example assigned to the sensors 58. The sensible unit length is N=4 times the distance between two sensors.

In a first step, the processing unit detects the active sensors. In a preferred embodiment, machine sensible elements are north and south polarity magnets. In that case, the sensors are hall sensors, and output a positive value when in front of north pole magnet, a negative value when in front of south pole magnet, and a close to zero value when not in front of any magnet, i.e. not active.

Figure 4:
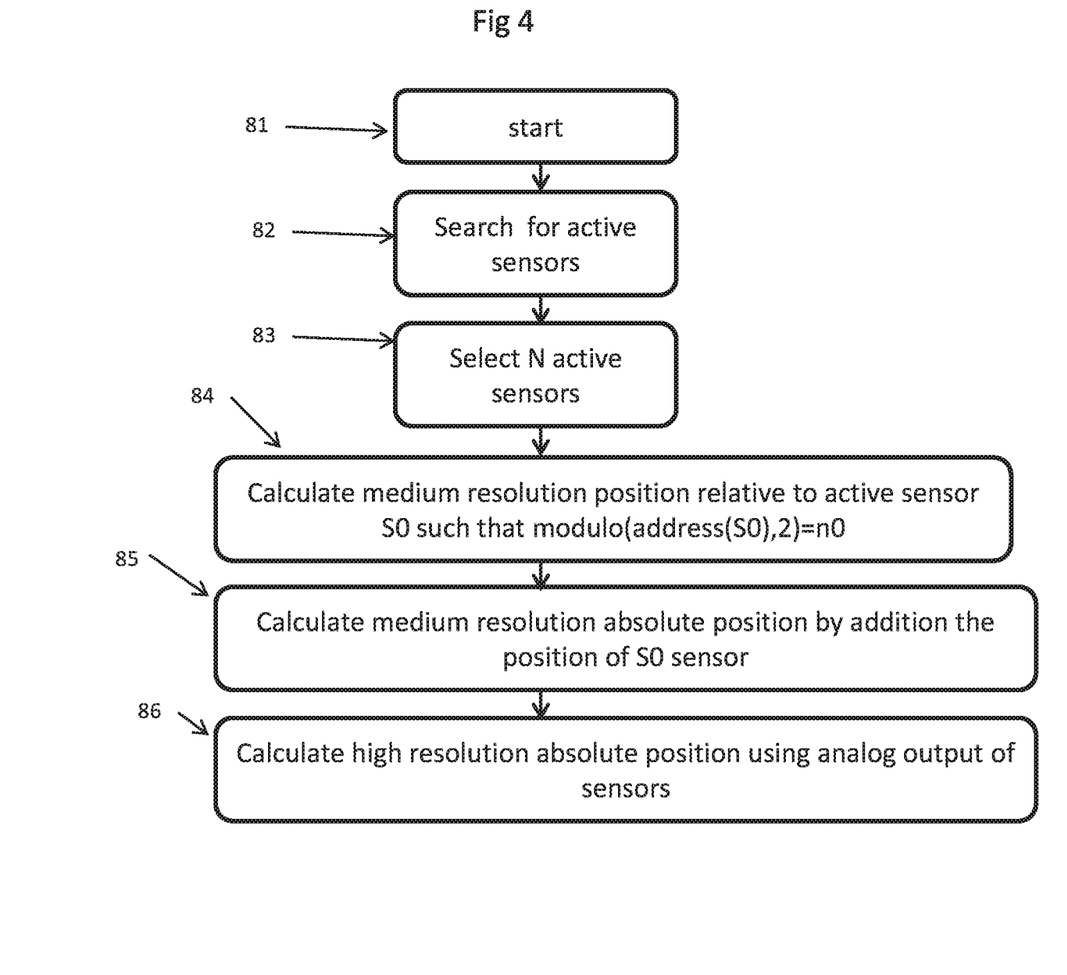
FIG. 4 is a simplified flow chart showing a process of calculating position using different levels of resolution according to embodiments of the present invention.

The processing unit may select N=4 active sensors. In FIG. 4, for example, active sensors 58.2, 58.3, 58.4 and 58.5 may be selected, of addresses 2, 3, 4 and 5.

To each selected sensor, a Boolean value V 1 is attributed if the output is positive, and 0 if negative. A digital code is then calculated:

$$\text{code} = \sum_{\text{on } N \text{ selected sensors}} V \cdot 2^{modulo(sensor\ address, 2)}$$

It is known from the above-mentioned U.S. Pat. No. 8,492,704 to Villaret et al, filed May 28, 2008, that the pattern of the encoder can provide a medium precision position relative to one of the active sensors, according to a pre-processed table. The precise position of each sensor may also be pre-loaded in the processing unit. Thus a medium absolute position can be calculated.

In order to obtain a high resolution position, the analog value of the sensors outputs can be used. As in U.S. Pat. No. 8,492,704, sensor sensitivity is designed to insure that there are at least two analog values of sensor output at intermediate values between the two values ranges when in front of machine sensible elements having different properties. The disclosed interpolation algorithm may then be used to calculate an absolute high resolution position.

In an embodiment, the sensible unit extends over a length equivalent to N=seven of the evenly spaced sensors. Such a configuration provides a medium resolution of 98 positions within one sensible element length, which represent an efficient use of seven bit possible codes (127). Any other number can be used, and reference is made to International Patent Application No. WO2013/098803A1 for a derivation of bit usage with sensors.

In contrast with U.S. Pat. No. 8,492,704, the set of active sensors changes with position.

In another aspect, if the number of active sensors is greater than N, i.e. N+p, then a number of combinations is available to select a set of N active sensors, and thus a same number of readings of the absolute position can be calculated. Such a redundant plural reading of the same position can be used to make the encoder comply with safety standards.

Due to inherent inaccuracies of the position of each sensor on the linear track, an initial calibration of the track may be required. The calibration may be provided after initial setup or during manufacture or may be programmed at each individual machine start up, and/or as demanded by the end user.

Depending on the type of sensors, various different arrangements and methods may be used to detect the active sensors.

For a given pattern, a fixed number N of active sensors may be used to calculate a code.

Active sensors are defined as being in proximity to the encoder head along its length of travel. The length of travel is the length of the path between the two endmost machine sensible elements.

In one arrangement, the encoder head is designed to extend over a length being a multiple P of the sensor interval, P being greater or equal to N. The number of active sensors may vary from a number P to P+1 in the particular case where encoder head ends are exactly aligned with sensors.

The processing unit detects those sensors not being in proximity to a machine sensible element, having a null readout value $V_0$ and thus being inactive. The active sensors are found by scanning all sensors starting from a given side and finding the first sensor with an analog value different from $V_o$. The range extends from the first sensor to the last sensor having a value away from $V_0$. It may occur that at a particular position the analog value of the left or right active sensor has the same $V_0$ value, not because it is inactive but rather because the sensor is in a transition range.

However, such a situation can be detected since the number of active sensors detected may be lower than the pre-defined value P. If P is equal to N, then the number of detected active signals is N−1, the result is indifferent whether the processing unit selects an additional hall sensor on the right or on the left, since these two sensors output the same V0 value, and are distanced by the machine sensible unit length, and thus normally have the same output value if both active. In the case of P greater than N, then processing unit can select N active sensors.

In a second arrangement, the encoder head length of travel is designed to be a multiple P of sensor interval plus a considerably smaller portion of a sensor interval. In addition one extremity of the encoder head length of travel may be designed to be mounted with the longest machine element of the pattern, with a length longer than the sensor interval and generating a value different from $V_o$ to sensors in proximity.

In such a case, the number of active sensors is a constant P, greater or equal to N. If P=N, then the active sensors at both ends may have the same value and the situation may be resolved by the same consideration as above for the first arrangement.

If P>N, the processing unit is always able to select N active sensors, counting N sensors from the first active sensor.

In a third arrangement, an additional machine-sensible element of a given property A may be placed outside of the encoder head extend, having a length being a multiple X of the sensor interval, X being greater than the maximum possible number of active sensors in proximity to a machine sensor element of property A for the given pattern. By detecting the X or more active sensors in proximity to the additional machine element, the active sensors range limit can be found.

Various other arrangements and methods can be imagined by skilled in the art to locate and select the active sensors.

As the sensors are on a stationary element, in effect the sensors can be mounted directly on a printed circuit board, and provided with static connections for power and signaling.

Reference is now made to FIG. 4 which is a simplified flow chart illustrating a process of calculating position based low medium and high resolution positions.

In a preferred embodiment, the processing unit may be a microcontroller, or an FPGA, able to make the various calculation of the encoder.

Start 81 represents the events that start the position calculation process of the processing unit. This event may be, for example, a request from a host computer or drive received through a communication line.

In module 82, the processing unit executes a search for the active sensors, using one of the methods described hereinabove.

In module 83, the processing units select N active sensors, so that their addresses modulo N covers the range from 0 to N−1.

In module 84, processing unit calculates a code using the equation:

$$code = \sum_{on\ N\ selected\ sensors} V \cdot 2^{modulo(sensor\ address, 2)}$$

V are boolean values of the active sensor output, V=1 when a active sensor is in proximity of machine element of first property, V=0 otherwise. Processing units then read a medium resolution position relative to the sensors S0 with address satisfying modulo(address,N)=$n_0$, where no is a pre-defined integer smaller than N, i.e. $0 \leq n_0 < N$. This relative position is given by a pre-defined table established for the selected pattern of the encoder.

In module 85, the absolute medium resolution position is calculating by adding to the medium resolution relative position the low resolution position data of the sensor S0. Such a low resolution position may have been pre-recorded with high precision using either data of the specific encoder design or during a calibration process.

In module 86, the analog values of transiting analog outputs of active sensors is process by algorithm similar to that described in U.S. Pat. No. 8,492,704.

Figure 5:
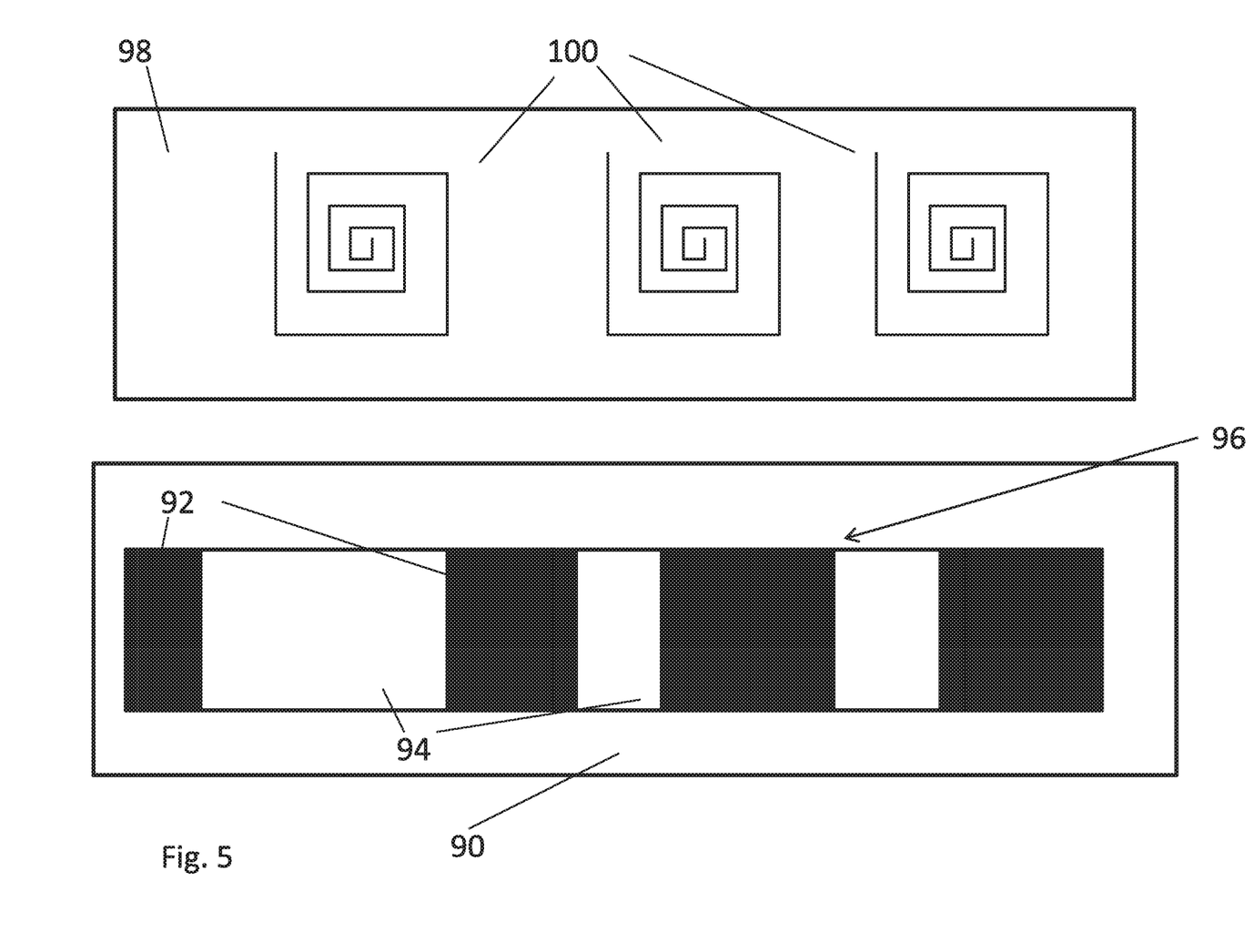
FIG. 5 is a simplified schematic diagram showing a processing method according to an embodiment of the present invention.

Reference is now made to FIG. 5 which is a simplified diagram illustrating a linear encoder based on eddy current detection. The moving part has a PCB 90 on which is a strip of alternating metal 92 and non-metal 94 elements arranged to form pattern 96. On the stationary part is a PCB 98 on which are mounted coils 100. As the coils come into measurement proximity of the metal, eddy currents are generated in the coil and may be detected.

Figure 6:
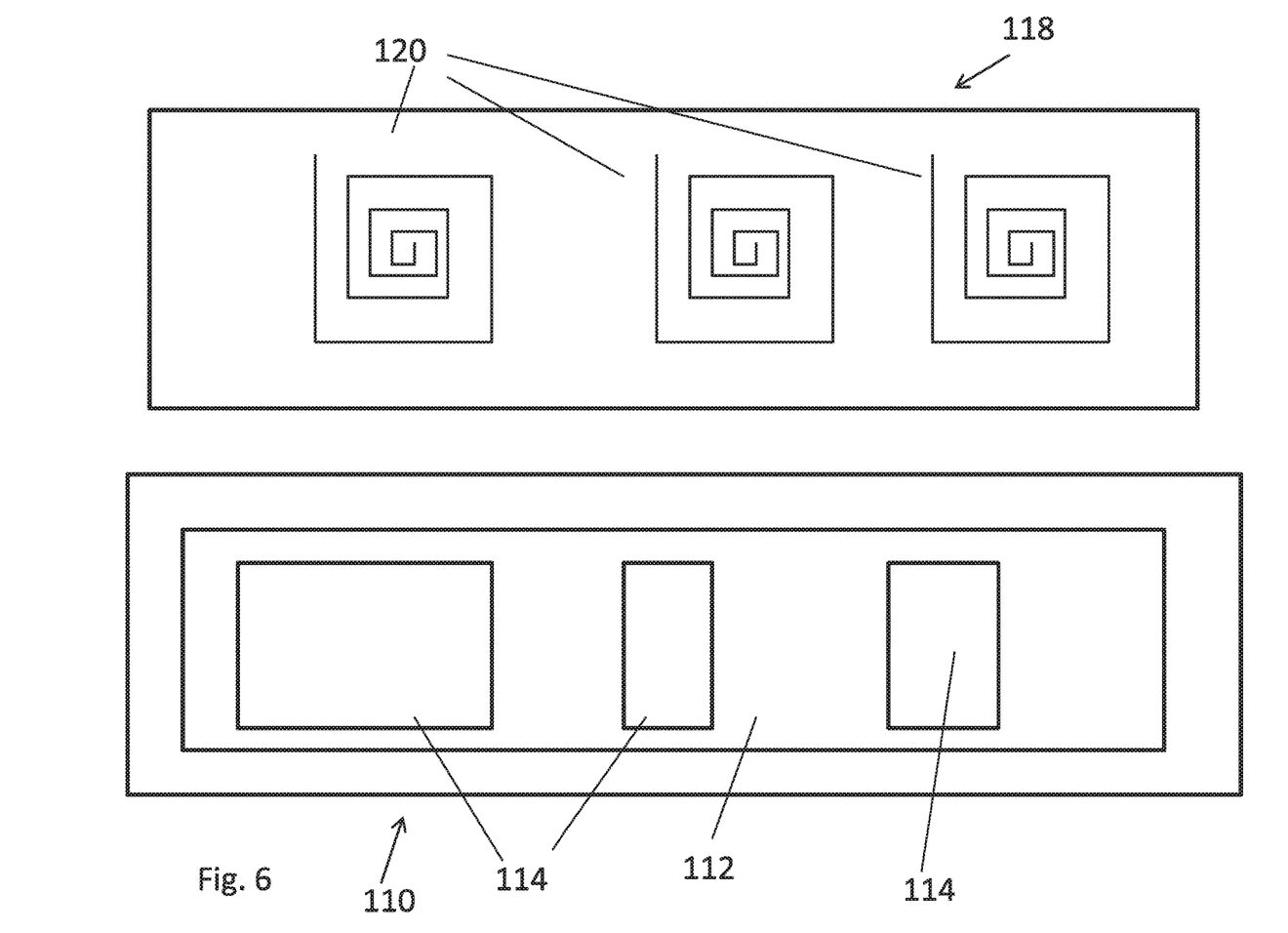
FIG. 6 is a simplified schematic diagram showing a linear encoder based on inductive detection according to an embodiment of the present invention.

Reference is now made to FIG. 6, which is a simplified diagram illustrating a linear encoder based on inductive detection. The moving part has a PCB 110 on which is a strip of metal 112 with holes 114, where no metal is present, arranged to form pattern. On the stationary part is a PCB 118 on which are mounted coils 120. As the coils come into measurement proximity of the holes, inductance reduces resonance in the coil and may be detected.

As explained above, the sensors may be mounted to a PCB. However PCB's can be heat sensitive and when the linear motor gets hot the sensors may change position due to expansion of the underlying PCB. Accurate measurement is undermined if the position of the sensors starts to change. There are a number of ways the problem can be solved. For example the sensors can be fixed to an underlying fixation layer of a material that is not sensitive to heat. Alternately, the PCB can be mounted at a single location chosen so that PCB expansion matches the expansion of the linear motor as a whole. A variation of this alternative provides the PCB with cutout sections in each of which a sensor is mounted and fixed to an underlying plate of material that is temperature stable. A number of other solutions will suggest themselves to the person skilled in the art.

An embodiment may provide a magnetic absolute linear encoder that can provide the same or greater level of resolution as an optical absolute encoder while making improvements relating to robustness, durability and cost.

It is expected that during the life of a patent maturing from this application many relevant sensors and linear drives and linear motors will be developed and the scope of the corresponding terms are intended to include all such new technologies a priori.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment, and the above description is to be construed as if this combination were explicitly written. Conversely, various features of the invention, which are, for brevity, described in the context of a single embodiment, may also be provided separately or in any suitable subcombination or as suitable in any other described embodiment of the invention, and the above description is to be construed as if these separate embodiments were explicitly written. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A linear encoder for a linear position measurement device having a stationary part and a moving part, the encoder designed to measure and encode a relative displacement between said stationary part and said moving part along a linear travel extent between a first travel end location and a second travel end location; the encoder comprising:
   a plurality of machine sensible elements, said elements laid out on a first of said parts in a predetermined pattern of known shape, the predetermined pattern defining a plurality of consecutively assigned segment lengths, said lengths differing from one another, each segment thus having a respective length, a respective property, and a segment position at which one of said machine sensible elements of the respective length and property is fixed, the predetermined pattern comprising a property changing along a length thereof; and
   a plurality of evenly placed sensors arranged along a second of said parts along an entirety of said linear travel extent between said first travel end location and said second travel end location, the length extending over a plurality of said evenly placed sensors, the sensors generating bits respectively when in proximity to one of said machine sensible elements, the sensors and predetermined pattern combining to generate a digital code from said bits, thereby to measure and encode said displacement using said pattern.

2. The linear encoder of claim 1, wherein said first part is said moving part and said second part is said stationary part.

3. The linear encoder of claim 1, wherein a length of said predetermined pattern is shorter than said entire extent.

4. The linear encoder of claim 1, wherein said evenly placed sensors each have a unique address.

5. The linear encoder of claim 1, wherein said evenly placed sensors comprise one member of the group of sensors consisting of optical, magnetic, inductive, capacitive, photoelectric and eddy current sensors.

6. The linear encoder of claim 5, wherein said machine sensible elements are one member of a group consisting of optical elements, magnetic elements, inductive elements, capacitive elements, and metallic field perturbation elements.

7. The linear encoder of claim 1, wherein said predetermined pattern defines a sequence of repeating segments, each segment comprising one cycle of change of said property.

8. The linear encoder of claim 7, wherein said segments are spread over a length equivalent to a predetermined number of said evenly spaced sensors.

9. The linear encoder of claim 7 wherein said segments are spread over a length selected to provide a plurality of readings of said displacement.

10. The linear encoder of claim 1, wherein said machine sensible elements have a second changing property.

11. The linear encoder of claim 7, further comprising an additional machine-sensible element placed outside of said pattern to indicate to said sensors a start of said length.

12. The linear encoder of claim 1, wherein said first part is said stationary part and said second part is said moving part.

13. A method of absolute linear encoding of a relative displacement between two parts over a total linear displacement length, the method comprising:
- providing a plurality of sensors spaced over said total displacement length;
- providing a predetermined pattern of machine-sensible elements, the pattern being of known shape, the predetermined pattern defining a plurality of consecutively assigned segment lengths, said lengths differing from one another, each segment thus having a respective length, a respective property, and a segment position at which one of said machine sensible elements of the respective length and property is fixed, the shape generating a code, said code comprising a property varying over distance along said pattern;
- displacing said pattern linearly with respect to said plurality of sensors over said displacement length, said pattern extending over a plurality of said sensors;
- generating bits from ones of said sensors when in proximity to one of said machine sensible elements, the sensors and predetermined pattern combining to generate a digital code from said bits, and
- measuring said displacing using said digital code.

14. The method of claim 13, wherein said sensors are evenly distributed over said displacement length.

15. The method of claim 13, comprising extending said pattern extends over a length equivalent to a predetermined number of said evenly distributed sensors.

16. The method of claim 14, comprising providing an additional sensible element at a first end of said pattern to indicate a pattern start or end to said plurality of evenly distributed sensors.

17. The method of claim 13, wherein said pattern is in a moving part of a linear motor and said plurality of sensors are on a stationary part of said linear motor.

18. The method of claim 13, comprising providing individual addressing to each of said plurality of sensors.

19. The method of claim 13, wherein a length of said pattern is shorter than said displacement length.

20. The method of claim 15, wherein said additional machine-sensible element is a repetition of a first machine-sensible element of said predetermined pattern.

21. The method of claim 13, wherein said plurality of sensors comprise one member of a group consisting of magnetic sensors, Hall-sensors, optical sensors, inductive sensors, and capacitive sensors.

22. The method of claim 13, comprising:
- detecting sensors currently in proximity with machine sensible elements as active sensors;
- calculating a first absolute low resolution position based on a position of the active sensors;
- calculating a code of a number N of bits, by setting each of said N bits to a Boolean output value of a respective one of said N active sensors, said code thereby defining a medium resolution position relative to one of the active sensors;
- combining said first absolute low resolution position value with said second relative medium resolution position value to calculate an absolute medium resolution position.

23. The method of claim 21, wherein said sensors output analog values, the method comprising:
- setting each analog output to a first Boolean value when the respective sensor analog output value is in a range indicating that it is in a predefined proximity range of a machine sensible element having said a first property, and a second value otherwise; and
- calculating a high resolution position from the analog output of said sensors.

24. A linear encoder for a linear position measurement feedback device having a stationary part and a moving part, the encoder designed to measure and encode a relative displacement between said stationary part and said moving part along a linear travel extent between a first travel end location and a second travel end location; the encoder comprising:
- a plurality of machine sensible elements arranged on a first of said parts in a predetermined pattern, the predetermined pattern defining a plurality of consecutively assigned segment lengths, said lengths differing from one another, each segment thus having a respective length, a respective property, and a segment position at which one of said machine sensible element of the respective length and property is fixed; and
- a plurality of evenly placed sensors arranged along a second of said parts and arranged such that at any given time only a subset of said plurality of sensors is in sensing proximity to a machine sensible element, sensors of said subset issuing bits, and said bits generating a code that indicates a linear position measurement.

25. The linear encoder of claim 24, wherein said second part is said stationary part.

* * * * *